United States Patent
Li

(10) Patent No.: US 10,491,112 B2
(45) Date of Patent: Nov. 26, 2019

(54) DRIVING CIRCUIT AND METHOD FOR BUCK-BOOST CONVERTER WITH BOOTSTRAP VOLTAGE REFRESH

(71) Applicant: Chengdu Monolithic Power Systems Co. Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/255,774

(22) Filed: Jan. 23, 2019

(65) Prior Publication Data

US 2019/0238051 A1    Aug. 1, 2019

(30) Foreign Application Priority Data

Jan. 26, 2018    (CN) .......................... 2018 1 0075842

(51) Int. Cl.
| | |
|---|---|
| *H02M 3/158* | (2006.01) |
| *H02M 1/08* | (2006.01) |
| *G05F 3/02* | (2006.01) |
| *H02M 3/07* | (2006.01) |
| *H02M 1/00* | (2006.01) |

(52) U.S. Cl.
CPC .............. *H02M 3/07* (2013.01); *H02M 1/08* (2013.01); *H02M 2001/0048* (2013.01)

(58) Field of Classification Search
CPC .. H02M 3/07; H02M 1/08; H02M 2001/0048; H02M 3/1582
See application file for complete search history.

(56) References Cited

U.S. PATENT DOCUMENTS

| | | | | |
|---|---|---|---|---|
| 7,145,316 B1* | 12/2006 | Galinski, III | ......... | H02M 3/156 323/288 |
| 7,782,027 B2* | 8/2010 | Williams | ................ | H02M 3/07 323/266 |
| 9,312,773 B2* | 4/2016 | Li | ....................... | H02M 3/1588 |
| 9,479,055 B2* | 10/2016 | Okamatsu | ........... | H02M 3/1582 |
| 9,484,758 B2* | 11/2016 | Chen | ..................... | H02J 7/0052 |
| 10,079,538 B2* | 9/2018 | Zhao | ....................... | H02M 3/07 |
| 2018/0041126 A1 | 2/2018 | Zhang | | |

* cited by examiner

*Primary Examiner* — Kenneth B Wells
(74) *Attorney, Agent, or Firm* — Perkins Coie LLP

(57) ABSTRACT

A driving circuit and method for buck-boost converter with bootstrap voltage refresh. The driving circuit includes a first bootstrap capacitor provided a first bootstrap voltage to drive the corresponding switch, and a second bootstrap capacitor provided a second bootstrap voltage to drive the corresponding switch. When converter operates in buck mode and the first or second bootstrap voltage is smaller than a threshold, the driving circuit generates current signals to respectively charge the first and second bootstrap capacitors based on an input voltage, and the first and second bootstrap voltages. When converter operates in boost mode and the first or second bootstrap voltage is smaller than the threshold, the driving circuit generates current signals to respectively charge the first and second bootstrap capacitors based on an output voltage, and the first and second bootstrap voltages.

19 Claims, 11 Drawing Sheets

DRIVING CIRCUIT AND METHOD FOR BUCK-BOOST CONVERTER WITH BOOTSTRAP VOLTAGE REFRESH

CROSS REFERENCE

This application claims the benefit of CN application No. 201810075842.1 filed on Jan. 26, 2018 and incorporated herein by reference.

TECHNICAL FIELD

This disclosure generally relates to buck-boost power converters, and more particularly but not exclusively relates to driving circuit and method of buck-boost power converters.

BACKGROUND

Buck-boost power converters can convert an input voltage into an output voltage higher than, equal to or lower than the input voltage and can generally be operated with wide input voltage range. Therefore, buck-boost power converters are widely used in power management applications. FIG. 1 illustrates a topology 50 of power switches of a conventional buck-boost power converter. The topology 50 comprises a first power switch 11, a second power switch 12, a third power switch 13 and a fourth power switch 14. The first power switch 11 and the third power switch 13 are coupled in series between an input port IN and a reference ground, and have a common connection referred to as a first switching node SW1. The second power switch 12 and the fourth power switch 14 are coupled in series between an output port OUT and the reference ground, and have a common connection referred to as a second switching node SW2. An inductor is coupled between the first switching node SW1 and the second switching node SW2. A capacitor is coupled between the output port OUT and the reference ground. An input voltage VIN at the input port IN is converted to an output voltage VOUT at the output port OUT through controlling the power switches 11-14 on and off.

If the first power switch 11 and the second power switch 12 are N channel power switching devices (e.g., N channel field effect transistors, N channel double diffused metal oxide semiconductor transistors etc.), bootstrap circuits should be provided to enhance the driving capability of the corresponding drivers. Generally, a first bootstrap capacitor CB1 coupled between the input port IN and the first switching node SW1 is configured to generate a first bootstrap voltage VBST1 referenced with the voltage at the first switching node SW1 to enhance the driving capability of corresponding driver to fully turn the first power switch 11 on and off, and a second bootstrap capacitor CB2 coupled between the output port OUT and the second switching node SW2 is configured to generate a second bootstrap voltage VBST2 referenced with the voltage at the second switching node SW2 to enhance the driving capability of corresponding driver to fully turn the second power switch 12 on and off.

The first bootstrap voltage VBST1 and the second bootstrap voltage VBST2 can be respectively generated through charging the first bootstrap capacitor CB1 and the second bootstrap capacitor CB2. However, under certain operation conditions, such as when the buck-boost power converter operates under light load or no-load condition, charges on the first bootstrap capacitor CB1 and the second bootstrap capacitor CB2 may not be enough, leading to decrease in the first bootstrap voltage VBST1 and the second bootstrap voltage VBST2 to the extent that may not be able to drive the first power switch 11 and the second power switch 12 to switch on and off normally. Therefore, when the first bootstrap voltage VBST1 and the second bootstrap voltage VBST2 are lower than a predetermined threshold, the first bootstrap voltage VBST1 and the second bootstrap voltage VBST2 should be refreshed, i.e., charging the first bootstrap capacitor CB1 and the second bootstrap capacitor CB2 so as to recover the first bootstrap voltage VBST1 and the second bootstrap voltage VBST2 to a desired bootstrap voltage value. Therefore, it is desired to have a solution for efficiently refreshing the first bootstrap voltage VBST1 and the second bootstrap voltage VBST2.

SUMMARY

Embodiments of the present invention are directed to a driving circuit for a buck-boost power converter having a first power switch and a third power switch coupled in series between an input port and a reference ground, and a second power switch and a fourth power switch coupled in series between an output port and the reference ground, comprising: a first bootstrap capacitor, configured to provide a first bootstrap voltage signal to drive the first power switch; a second bootstrap capacitor, configured to provide a second bootstrap voltage signal to drive the second power switch; a first current control circuit; a second current control circuit; a power supply, configured to charge the first bootstrap capacitor when the third power switch is turned on, and the second bootstrap capacitor when the fourth power switch is turned on; when the buck-boost power converter operates in a buck mode, the second current control circuit is disabled, and the first current control circuit is enabled to receive an input voltage signal, the first bootstrap voltage signal and the second bootstrap voltage signal, and wherein when the first bootstrap voltage signal or the second bootstrap voltage signal is smaller than a bootstrap refresh threshold, the first current control circuit is configured to generate a first charging current signal and a second charging current signal to respectively charge the first bootstrap capacitor and the second bootstrap capacitor; when the buck-boost power converter operates in a boost mode, the first current control circuit is disabled, and the second current control circuit is enabled to receive an output voltage signal, the first bootstrap voltage signal and the second bootstrap voltage signal, and wherein when the second bootstrap voltage signal or the second bootstrap voltage signal is smaller than a bootstrap refresh threshold, the first current control circuit is configured to generate a third charging current signal and a fourth charging current signal to respectively charge the first bootstrap capacitor and the second bootstrap capacitor; and when the buck-boost power converter operates in a buck-boost mode, both the first current control circuit and the second current control circuit are disabled.

Embodiments of the present invention are further directed to a driving method for a buck-boost power converter having a first power switch and a third power switch coupled in series between an input port and a reference ground, a second power switch and a fourth power switch coupled in series between an output port and the reference ground, a first bootstrap capacitor configured to provide a first bootstrap voltage signal to drive the first power switch, and a second bootstrap capacitor configured to provide a second bootstrap voltage signal to drive the second power switch, wherein a common connection of the first power switch and the second power switch is connected to common connection of the third power switch and the fourth power switch through an inductor, and the driving method comprising: determining an operating mode of the buck-boost power converter; when the operating mode is a buck mode, charging the first bootstrap capacitor by a power supply when the third power switch is turned on, determining whether the first bootstrap voltage signal or the second bootstrap voltage signal is smaller than a bootstrap refresh threshold, if the first bootstrap voltage signal or the second bootstrap voltage signal is smaller than the bootstrap refresh threshold, generating a first charging current signal and a second charging current signal to respectively charge the first bootstrap capacitor and the second bootstrap capacitor based on an input voltage signal, the first bootstrap voltage signal and the second bootstrap voltage signal; when the operating mode is a boost mode, charging the second bootstrap capacitor by the power supply when the fourth power switch is turned on; determining whether the first bootstrap voltage signal or the second bootstrap voltage signal is smaller than the bootstrap refresh threshold; if the first bootstrap voltage signal or the second bootstrap voltage signal is smaller than the bootstrap refresh threshold, generating a third charging current signal and a fourth charging current signal to respectively charge the first bootstrap capacitor and the second bootstrap capacitor based on an output voltage signal, the first bootstrap voltage signal and the second bootstrap voltage signal; and when the operating mode is a buck-boost mode, charging the first bootstrap capacitor by the power supply once the third power switch is turned on, and charging the second bootstrap capacitor by the power supply once the fourth power switch is turned on.

BRIEF DESCRIPTION OF THE DRAWINGS

Non-limiting and non-exhaustive embodiments are described with reference to the following drawings.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
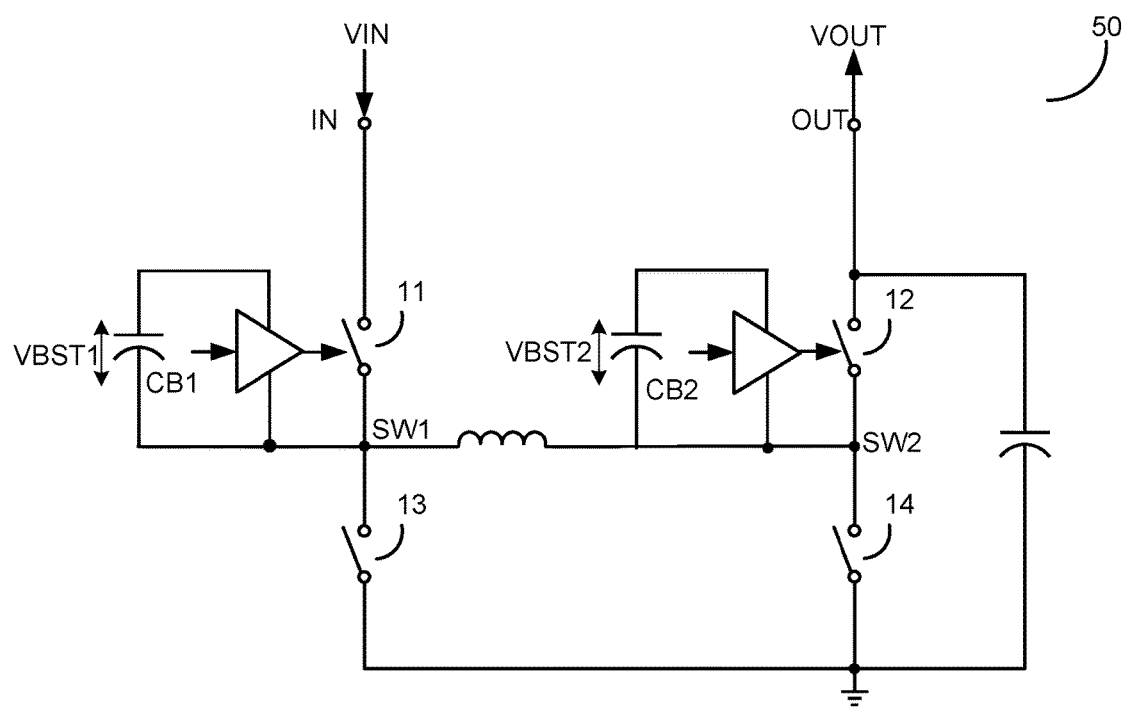
FIG. 1 illustrates a topology 50 of power switches of a conventional buck-boost power converter.
Figure 2:
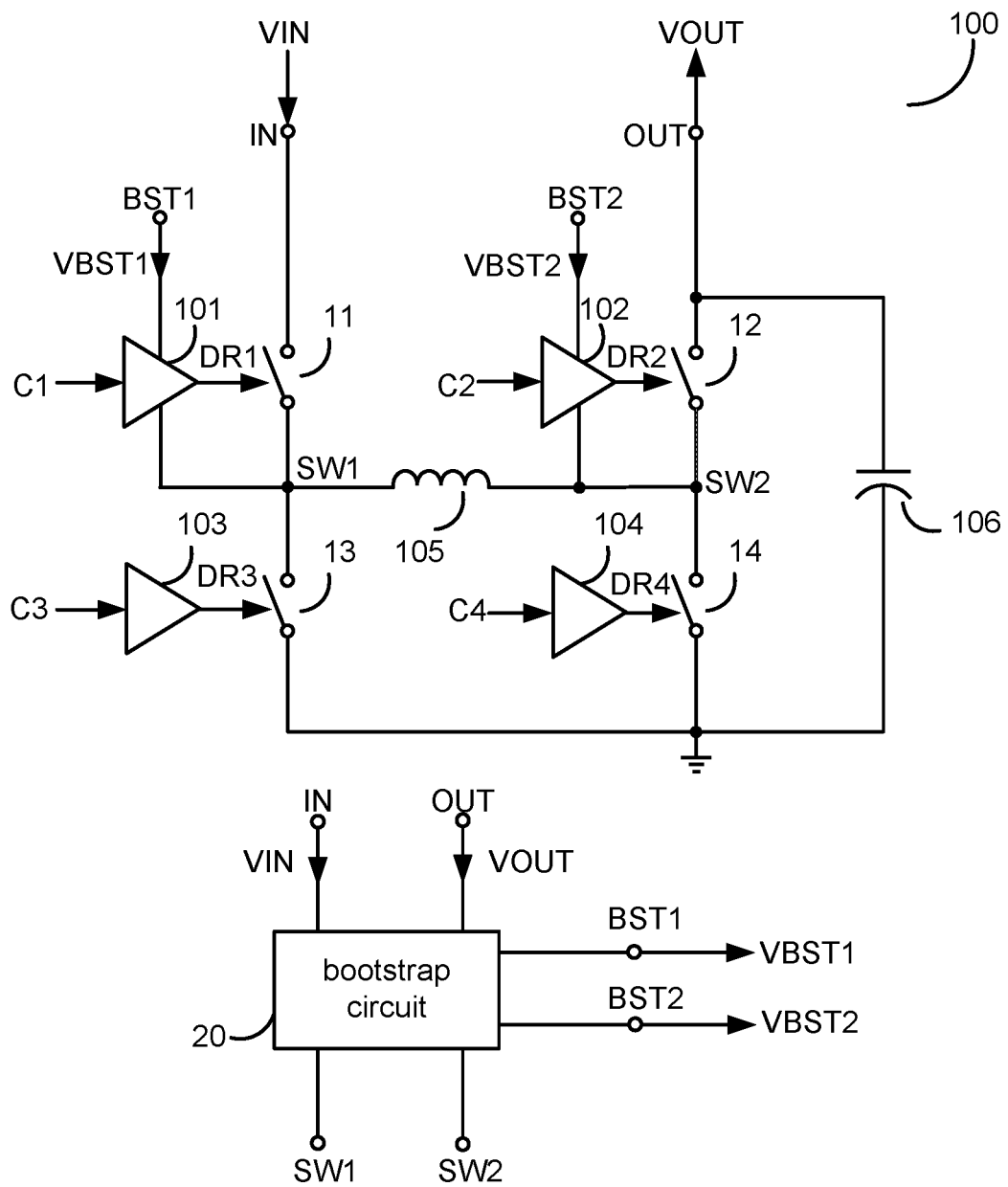
FIG. 2 illustrates a schematic diagram of a buck-boost power converter 100 in accordance with an exemplary embodiment of the present invention.

FIG. 2 illustrates a schematic diagram of a buck-boost power converter 100 in accordance with an exemplary embodiment of the present invention. As shown in FIG. 2, the buck-boost power converter 100 comprises a first power switch 11, a second power switch 12, a third power switch 13, a fourth power switch 14, an inductor 105, a capacitor 106. The first power switch 11 and the third power switch 13 are coupled in series between an input port IN and a reference ground, and have a common connection referred to as a first switching node SW1. The second power switch 12 and the fourth power switch 14 are coupled in series between an output port OUT and the reference ground, and have a common connection referred to as a second switching node SW2. The inductor 105 is coupled between the first switching node SW1 and the second switching node SW2. The capacitor 106 is coupled between the output port OUT and the reference ground. An input voltage VIN at the input port IN is converted to an output voltage VOUT at the output port OUT through controlling the power switches 11-14 on and off.

In order to decrease power consumption, the buck-boost power converter 100 may operate in different operation modes depending on different relationships of the input voltage VIN and the output voltage VOUT. In an embodiment, when the input voltage VIN is larger than the output voltage VOUT, the buck-boost power converter 100 is configured to operate in a buck mode in which the first power switch 11 and the third power switch 13 are switched on and off while the second power switch 12 is kept on and the fourth power switch 14 is kept off. In an embodiment, when the input voltage VIN is smaller than the output voltage VOUT, the buck-boost power converter 100 is configured to operate in a boost mode in which the second power switch 12 and the fourth power switch 14 are switched on and off while the first power switch 11 is kept on and the third power switch 13 is kept off. In an embodiment, when the input voltage VIN is approximately equal to the output voltage VOUT, the buck-boost power converter 100 is configured to operate in a buck-boost mode.

In the exemplary embodiment of FIG. 2, the buck-boost power converter 100 may further comprise a first driver 101, a second driver 102, a third driver 103 and a fourth driver 104 respectively to drive the power switches 11-14. In detail, the first driver 101 may comprise a first supply terminal coupled to a first bootstrap voltage supply node BST1 to receive a first bootstrap voltage VBST1, a second supply terminal coupled to the first switching mode SW1, an input terminal configured to receive a first control signal C1, and an output terminal configured to provide a first driving signal DR1 for driving the first power switch 11 on and off. The second driver 102 may comprise a first supply terminal coupled to a second bootstrap voltage supply node BST2 to receive a second bootstrap voltage VBST2, a second supply terminal coupled to the second switching mode SW2, an input terminal configured to receive a second control signal C2, and an output terminal configured to provide a second driving signal DR2 for driving the second power switch 12 on and off. The third driver 103 may be configured to receive a third control signal C3 to generate a third driving signal DR3 for driving the third power switch 13 on and off. The fourth driver 104 may be configured to receive a fourth control signal C4 to generate a fourth driving signal DR4 for driving the fourth power switch 14 on and off.

In the exemplary embodiment of FIG. 2, the buck-boost power converter 100 may further comprise a bootstrap circuit 20. The bootstrap circuit 20 may be coupled to the input port IN to receive the input voltage VIN, the output port OUT to receive the output voltage VOUT, the first switching node SW1 and the second switching node SW2, and configured to generate the first bootstrap voltage VBST1 at the first bootstrap voltage supply node BST1 and the second bootstrap voltage VBST2 at the second bootstrap voltage supply node BST1.

Figure 3:
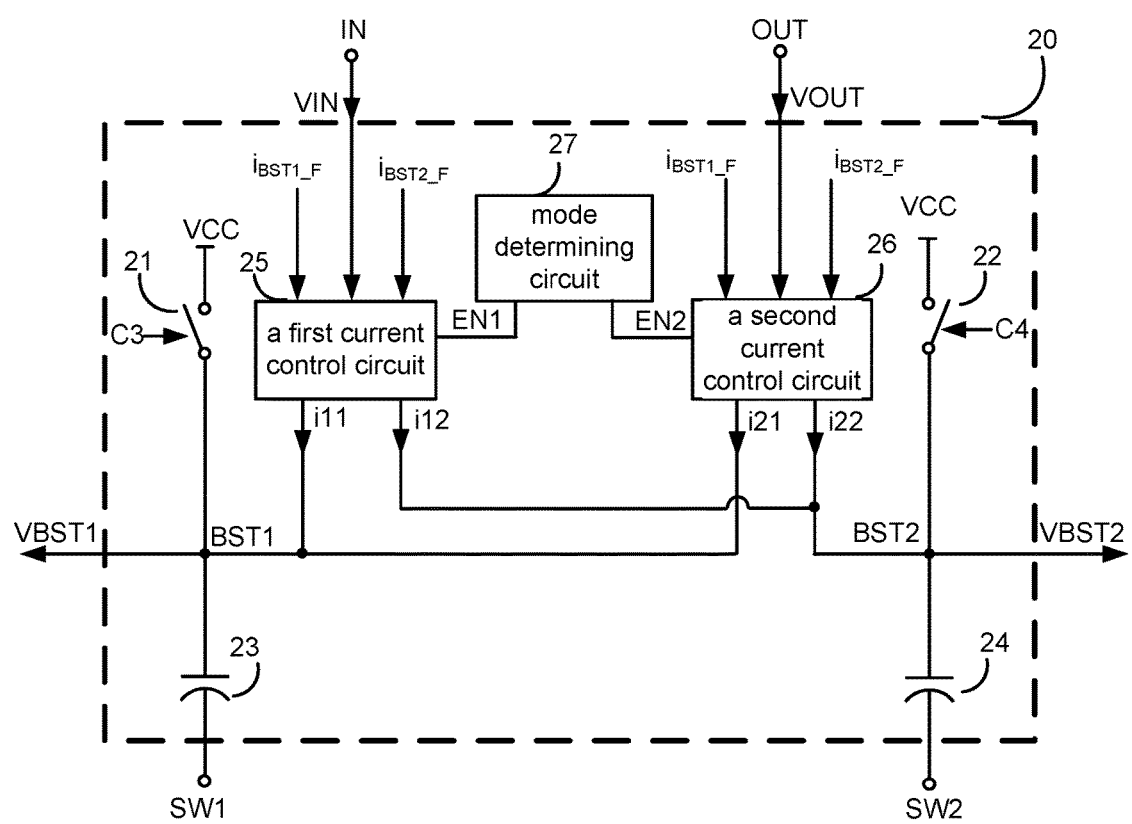
FIG. 3 illustrates a schematic diagram of the bootstrap circuit 20 of FIG. 2 in accordance with an exemplary embodiment of the present invention.

FIG. 3 illustrates a schematic diagram of the bootstrap circuit 20 of FIG. 2 in accordance with an exemplary embodiment of the present invention. As shown in FIG. 3, the bootstrap circuit 20 may comprise a first charging switch 21, a second charging switch 22, a first bootstrap capacitor 23, a second bootstrap capacitor 24, a first current control circuit 25, a second current control circuit 26 and a mode determining circuit 27.

In the exemplary embodiment of FIG. 3, the first charging switch 21 and the first bootstrap capacitor 23 are connected in series between a power supply VCC and the first switching mode SW1, and have a common connection referred to as the first bootstrap voltage supply node BST1, and the voltage at the first bootstrap voltage supply node BST1 referenced with the voltage at the first switching node SW1 is operated as the first bootstrap voltage signal VBST1. The first charging switch 21 may be controlled by the third control signal C3 which is also configured to switch the first charging switch 21 on and off, i.e., on and off switching of the first charging switch 21 is simultaneous with on and off switching of the third power switch 13. Generally, the power supply VCC may be generated based on the input voltage signal VIN. In an embodiment, the power supply VCC may comprise a power supply voltage signal which may be provided to other active elements, such as comparators, amplifiers and the like, as well as the first current control circuit 25 and the second current control circuit 26. In the other embodiment, the power supply VCC may comprise a current signal.

In the exemplary embodiment of FIG. 3, the second charging switch 22 and the second bootstrap capacitor 24 are connected in series between the power supply VCC and the second switching mode SW2, and have a common connection referred to as the second bootstrap voltage supply node BST2, and the voltage at the second bootstrap voltage supply node BST2 referenced with the voltage at the second switching node SW2 is operated as the second bootstrap voltage signal VBST2. The second charging switch 22 may be controlled by the fourth control signal C4 which is also configured to switch the second charging switch 22 on and off, i.e, on and off switching of the second charging switch 22 is simultaneous with on and off switching of the fourth power switch 14.

The mode determining circuit 27 is configured to determine the buck-boost power converter 100 to operate in the buck mode, the boost mode or the buck-boost mode, and further configured to generate a first enable signal EN1 and a second enable signal EN2 to respectively enable or disable the first current control circuit 25 and the second current control circuit 26.

In an embodiment, when the buck-boost power converter 100 operates in the buck mode, the first power switch 11 and the third power switch 13 are switched on and off by the first control signal C1 and the third control signal C3, and the second power switch 12 is kept on while the fourth power switch 14 is kept off. When the third control signal C3 is in an active state (e.g., logic high state), both the third power switch 13 and the first charging switch 21 may be turned on. The first switching node SW1 is connected to the reference ground, and the power supply VCC may be configured to charge the first bootstrap capacitor 23 via the first charging switch 21 to refresh the first bootstrap voltage signal VBST1. In some occasions, for example, in a light load or no load application, the buck-boost power converter 100 may get into a discontinuous current mode (DCM), in which the third power switch 13 may rarely be turned on or the conduction time of the third power switch 13 is short. In such applications, the charging time of the first bootstrap capacitor 23 by the power supply VCC is limited.

Therefore, at the same time, the first enable signal EN1 is configured to enable the first current control circuit 25, and the second enable signal EN2 is configured to disable the second current control circuit 26. The first current control circuit 25 may be configured to receive the input voltage signal VIN, a first feedback signal iBST1_F and a second feedback signal iBST2_F, wherein the first feedback signal iBST1_F is indicative of the first bootstrap voltage signal VBST1, and the second feedback signal iBST2_F is indicative of the second bootstrap voltage signal VBST2. The first current control circuit 25 may be configured to determine whether the first feedback signal iBST1_F or the second feedback signal iBST2_F is smaller than a bootstrap refresh threshold. When either first feedback signal iBST1_F or the second feedback signal iBST2_F is smaller than the bootstrap refresh threshold, the first current control circuit 25 may be configured to generate a first charging current signal i11 and a second charging current signal i12 to respectively charge the first bootstrap capacitor 23 and the second bootstrap capacitor 24 to refresh the first bootstrap voltage signal VBST1 and second bootstrap voltage signal VBST2 based on the input voltage signal VIN, the first feedback signal iBST1_F and the second feedback signal iBST2_F. In an embodiment, the first feedback signal iBST1_F and the second feedback signal iBST2_F may be current signals.

In an embodiment, when the buck-boost power converter 100 operates in the boost mode, the second power switch 12 and the fourth power switch 14 are switched on and off by the second control signal C2 and the fourth control signal C4, and the first power switch 11 is kept on while the third power switch 13 is kept off. When the fourth control signal C4 is in the active state (e.g., logic high state), both the fourth power switch 14 and the second charging switch 22 may be turned on. The second switching mode SW2 is connected to the reference ground, and the power supply VCC may be configured to charge the second bootstrap capacitor 24 via the second charging switch 22 to refresh the second bootstrap voltage signal VBST2. As mentioned in the foregoing paragraph, in some occasions, the fourth power switch 14 may rarely be turned on or the conduction time of the fourth power switch 14 is short, which may limit the charging time of the second bootstrap capacitor 24 by the power supply VCC.

Therefore, at the same time, the first enable signal EN1 is configured to disable the first current control circuit 25, and the second enable signal EN2 is configured to enable the second current control circuit 26. The second current control circuit 26 may be configured to receive the output voltage signal VOUT, the first feedback signal iBST1_F and the second feedback signal iBST2_F, and further configured to determine whether the first feedback signal iBST1_F or the second feedback signal iBST2_F is smaller than the bootstrap refresh threshold. When either the first feedback signal iBST1_F or the second feedback signal iBST2_F is smaller than the bootstrap refresh threshold, the second current control circuit 26 may be configured to generate a third charging current signal i21 and a fourth charging current signal i22 to respectively charge the first bootstrap capacitor 23 and the second bootstrap capacitor 24 to refresh the first bootstrap voltage signal VBST1 and second bootstrap voltage signal VBST2 based on the output voltage signal VOUT, the first feedback signal iBST1_F and the second feedback signal iBST2_F.

In an embodiment, when the buck-boost power converter 100 operates in the buck-boost mode, both the first current control circuit 25 and the second current control circuit 26 are respectively disabled by the first enable signal EN1 and the second enable signal EN2. No matter the buck-boost power converter 100 operates at the DCM or at a continuous current mode (CCM), the first bootstrap voltage signal VBST1 can be refreshed by the power supply VCC via the first charging switch 21, and the second bootstrap voltage signal VBST2 can be refreshed by the power supply VCC via the second charging switch 22.

In the exemplary embodiment of FIG. 3, the power switches 11-14 may be illustrated as any suitable semiconductor devices such as Metal Oxide Semiconductor Field Effect Transistors ("MOSFETs"), Junction Field Effect Transistors ("JFETs"), Insulated Gate Bipolar Translators ("IGBTs"), Double Diffusion Metal-Oxide-Semiconductor ("DMOS"), and the like.

Figure 4:
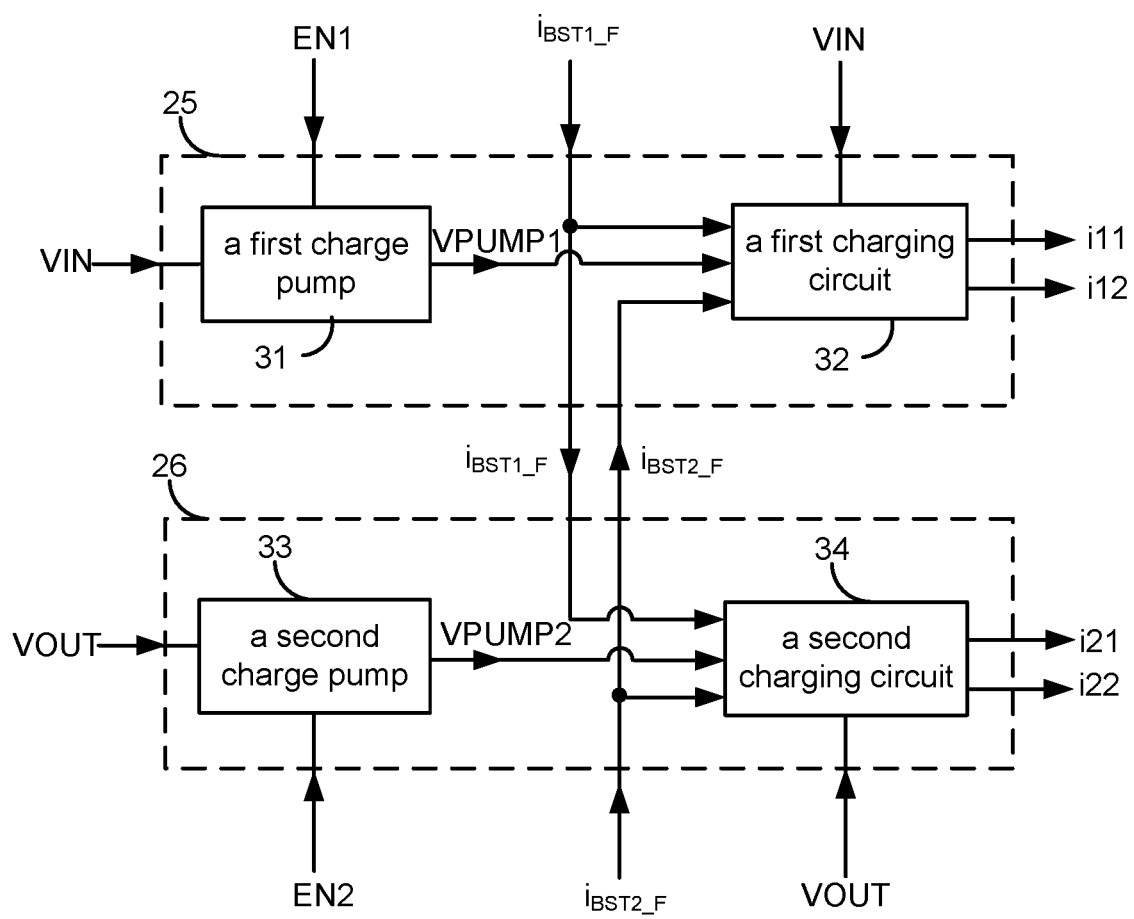
FIG. 4 illustrates a schematic diagram of the first current control circuit 25 and the second current control circuit 26 in accordance with an exemplary embodiment of the present invention.

FIG. 4 illustrates a schematic diagram of the first current control circuit 25 and the second current control circuit 26 in accordance with an exemplary embodiment of the present invention. As shown in FIG. 4, the first current control circuit 25 may comprise a first charge pump 31 and a first charging circuit 32. The second current control circuit 26 may comprise a second charge pump 33 and a second charging circuit 34.

In accordance with an exemplary embodiment of the present invention, when the buck-boost power converter 100 operates in the buck mode, the first enable signal EN1 is configured to enable the first current control circuit 25, and the second enable signal EN2 is configured to disable the second current control circuit 26. The first charge pump 31 may be configured to receive the input voltage signal VIN, and further configured to generate a first pump voltage signal VPUMP1 based on the input voltage signal VIN. The first charging circuit 32 may be configured to receive the first pump voltage signal VPUMP1, the input voltage signal VIN, the first feedback signal iBST1_F and the second feedback signal iBST2_F, and further configured to generate the first charging current signal i11 and the second charging current signal i12 based on the first pump voltage signal VPUMP1, the input voltage signal VIN, the first feedback signal iBST1_F and the second feedback signal iBST2_F.

In accordance with an exemplary embodiment of the present invention, when the buck-boost power converter 100 operates in the boost mode, the first enable signal EN1 is configured to disable the first current control circuit 25, and the second enable signal EN2 is configured to enable the second current control circuit 26. The second charge pump 33 may be configured to receive the output voltage signal VOUT, and further configured to generate a second pump voltage signal VPUMP2 based on the output voltage signal VOUT. The second charging circuit 34 may be configured to receive the second pump voltage signal VPUMP2, the output voltage signal VOUT, the first feedback signal iBST1_F and the second feedback signal iBST2_F, and further configured to generate the third charging current signal i21 and the fourth charging current signal i22 based on the second pump voltage signal VPUMP2, the output voltage signal VOUT, the first feedback signal iBST1_F and the second feedback signal iBST2_F.

Figure 5:
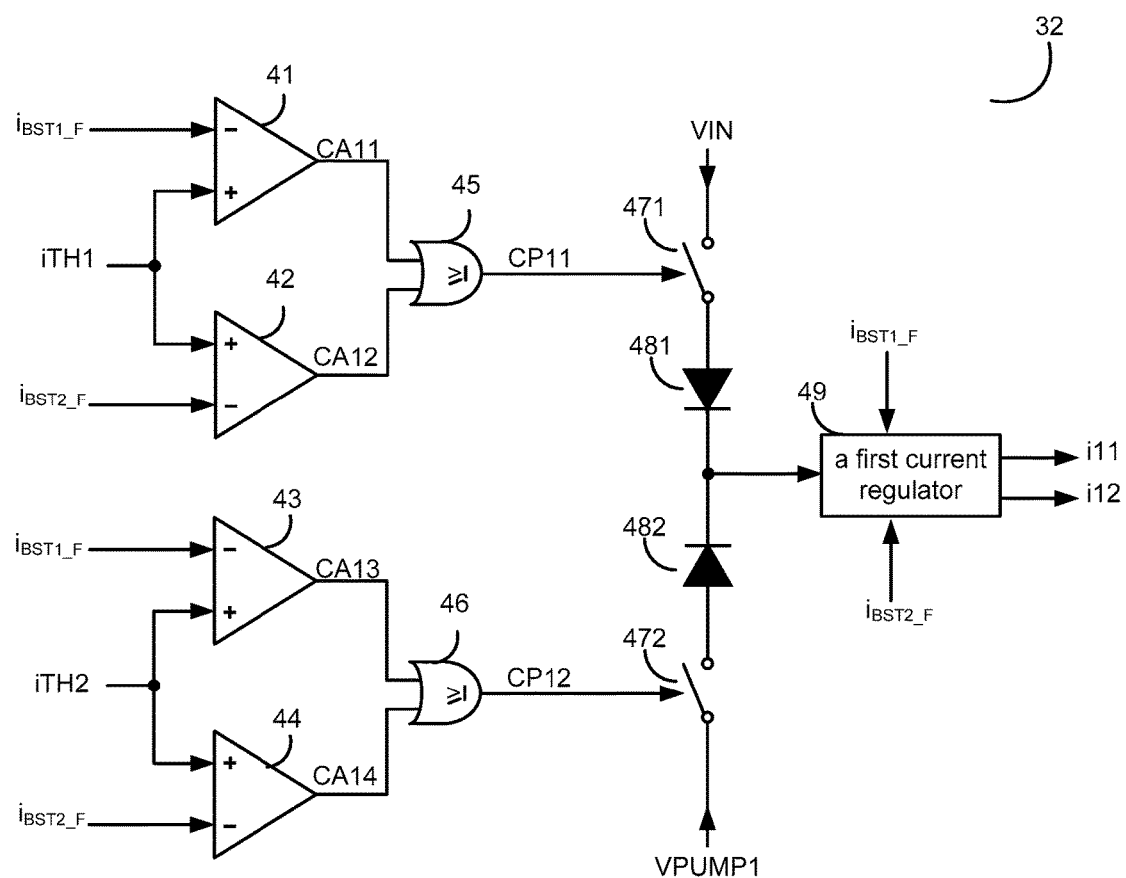
FIG. 5 illustrates a schematic diagram of the first charging circuit 32 of FIG. 4 in accordance with an exemplary embodiment of the present invention.

FIG. 5 illustrates a schematic diagram of the first charging circuit 32 of FIG. 4 in accordance with an exemplary embodiment of the present invention. As shown in FIG. 5, the first charging circuit 32 may comprise a comparator 41, a comparator 42, a comparator 43, a comparator 44, an "OR" logic gate 45, an "OR" logic gate 46, a switch 471, a switch 472, a diode 481, a diode 482 and a first current regulator 49.

The comparator 41 may comprise a first input terminal configured to receive the first feedback signal iBST1_F, a second input terminal configured to receive a first refresh threshold iTH1, and an output terminal. The comparator 41 may be configured to compare the first feedback signal iBST1_F with the first refresh threshold iTH1 to generate a comparing signal CA11. In an embodiment, when the first feedback signal iBST1_F is smaller than the first refresh threshold iTH1, the comparing signal CA11 is in the active state (e.g., logic high state).

The comparator 42 may comprise a first input terminal configured to receive the second feedback signal iBST2_F, a second input terminal configured to receive the first refresh threshold iTH1, and an output terminal. The comparator 42 may be configured to compare the second feedback signal iBST2_F with the first refresh threshold ITH1 to generate a comparing signal CA12. In an embodiment, when the second feedback signal iBST2_F is smaller than the first refresh threshold iTH1, the comparing signal CA12 is in the active state (e.g., logic high state).

The "OR" logic gate 45 may comprise a first input terminal configured to receive the comparing signal CA11, a second input terminal configured to receive the comparing signal CA12, and an output terminal. The "OR" logic gate 45 may be configured to conduct "OR" logic operation to the comparing signal CA11 and the comparing signal CA12 to provide a logic signal CP11 at the output terminal. Either the comparing signal CA11 or the comparing signal CA12 is in the active state, the logic signal CP11 is activated to control the switch 471 on.

The comparator 43 may comprise a first input terminal configured to receive the feedback signal iBST1_F, a second input terminal configured to receive a second refresh threshold iTH2, and an output terminal, wherein the second refresh threshold iTH2 is smaller than the first refresh threshold iTH1. The comparator 43 may be configured to compare the first feedback signal iBST1_F with the second refresh threshold iTH2 to generate a comparing signal CA13. In an embodiment, when the first feedback signal iBST1_F is smaller than the second refresh threshold iTH2, the comparing signal CA13 is in the active state (e.g., logic high state).

The comparator 44 may comprise a first input terminal configured to receive the second feedback signal iBST2_F, a second input terminal configured to receive the second refresh threshold iTH2 and an output terminal. The comparator 44 may be configured to compare the second feedback signal iBST2_F with the second refresh threshold iTH2 to generate a comparing signal CA14. In an embodiment, when the second feedback signal iBST2_F is smaller than the second refresh threshold iTH2, the comparing signal CA14 is in the active state (e.g., logic high state).

The "OR" logic gate 46 may comprise a first input terminal configured to receive the comparing signal CA13, a second input terminal configured to receive the comparing signal CA14, and an output terminal. The "OR" logic gate 46 may be configured to conduct "OR" logic operation to the comparing signal CA13 and the comparing signal CA14 to provide a logic signal CP12 at the output terminal. Either the comparing signal CA13 or the comparing signal CA14 is in the active state, the logic signal CP12 is activated to control the switch 472 on.

The switch 471 may have a first terminal configured to receive the input voltage signal VIN, a second terminal coupled to the first current regulating circuit 49 via the diode 481, and a control terminal configured to receive the logic signal CP11. The switch 472 may have a first terminal configured to receive the first pump voltage signal VPUMP1, a second terminal coupled to the first current regulating circuit 49 via the diode 482, and a control terminal configured to receive the logic signal CP12.

When the first feedback signal iBST1_F or the second feedback signal iBST2_F is smaller than the first refresh threshold iTH1 and larger than the second refresh threshold iTH2 (i.e., the logic signal CP11 is active, and the logic signal CP12 is inactive), the input voltage signal VIN is provided to the first current regulating circuit 49 through the switch 471 and the diode 481. The first current regulating circuit 49 may be configured to receive the input voltage signal VIN, the first feedback signal iBST1_F and the second feedback signal iBST2_F, and further configured to generate the first charging current signal i11 based on the input voltage signal VIN and the first feedback signal iBST1_F, and to generate the second charging current signal i12 based on the input voltage signal VIN and the second feedback signal iBST2_F. In an embodiment, the larger the first feedback signal iBST1_F is, the smaller the first charging current signal i11 is; and the larger the second feedback signal iBST2_F is, the smaller the second charging current signal i12 is.

When the first feedback signal iBST1_F or the second feedback signal iBST2_F is smaller than the second refresh threshold iTH2 (i.e., both the logic signal CP1 and the logic signal CP2 are active), both the input voltage signal VIN and the first pump voltage signal VPUMP1 are provided to the first current regulating circuit 49. The first current regulating circuit 49 may be configured to receive the input voltage signal VIN, the first pump voltage signal VPUMP1, the first feedback signal iBST1_F and the second feedback signal iBST2_F, and further configured to generate the first charging current signal i11 based on the input voltage signal VIN, the first pump voltage signal VPUMP1 and the first feedback signal iBST1_F, and to generate the second charging current signal i12 based on the input voltage signal VIN, the first pump voltage signal VPUMP1 and the second feedback signal iBST2_F. In an embodiment, the larger the first feedback signal iBST1_F is, the smaller the first charging current signal i11 is; and the larger the second feedback signal iBST2_F is, the smaller the second charging current signal i12 is.

When the first feedback signal iBST1_F or the second feedback signal iBST2_F is larger than the first refresh threshold iTH1, both the switch 471 and the switch 472 are turned off. The first current regulating circuit 49 is unable to generate the first charging current signal i11 and the second charging current signal i12.

Figure 6:
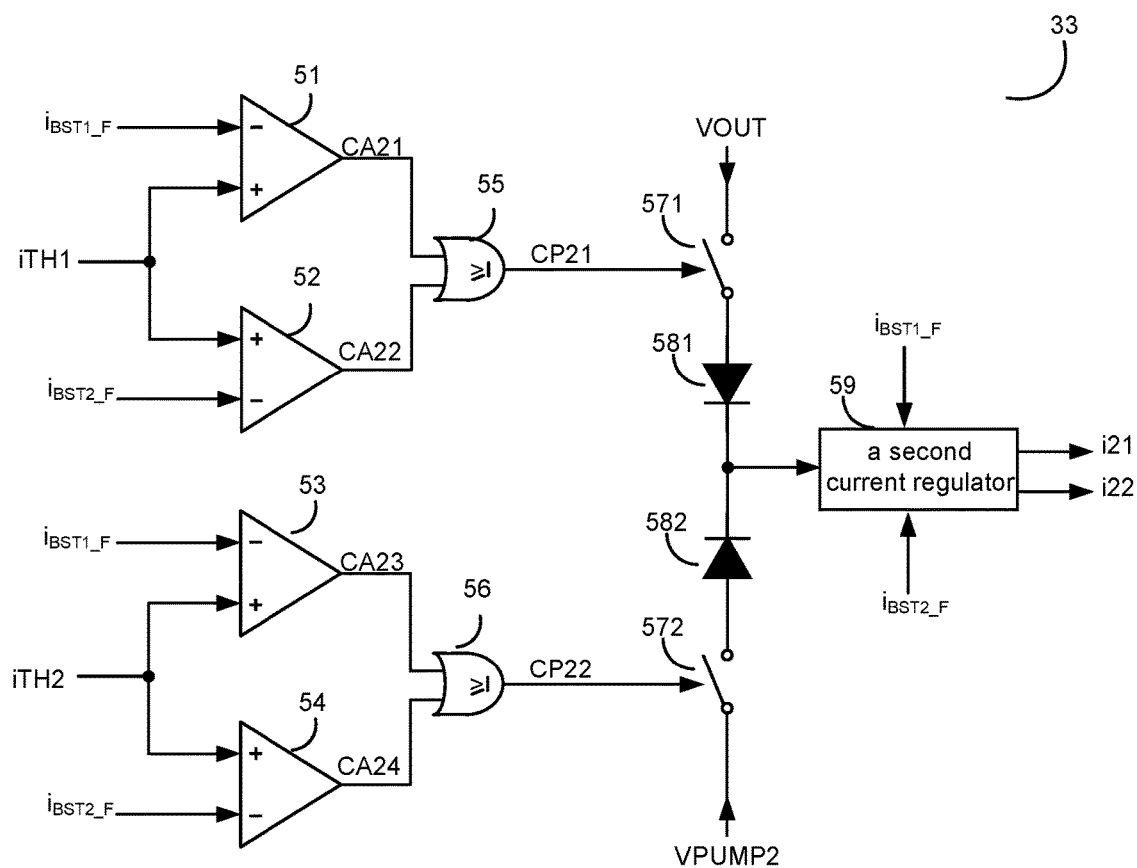
FIG. 6 illustrates a schematic diagram of the second charging circuit 34 of FIG. 4 in accordance with an exemplary embodiment of the present invention.

FIG. 6 illustrates a schematic diagram of the second charging circuit 34 of FIG. 4 in accordance with an exemplary embodiment of the present invention. As shown in FIG. 6, the second charging circuit 34 may comprise a comparator 51, a comparator 52, a comparator 53, a comparator 54, an "OR" logic gate 55, an "OR" logic gate 56, a switch 571, a switch 572, a diode 581, a diode 582 and a second current regulator 59.

The comparator 51 may comprise a first input terminal configured to receive the first feedback signal iBST1_F, a second input terminal configured to receive the first refresh threshold iTH1, and an output terminal. The comparator 51 may be configured to compare the first feedback signal iBST1_F with the first refresh threshold iTH1 to generate a comparing signal CA21. In an embodiment, when the first feedback signal iBST1_F is smaller than the first refresh threshold iTH1, the comparing signal CA21 is in the active state (e.g., logic high state).

The comparator 52 may comprise a first input terminal configured to receive the second feedback signal iBST2_F, a second input terminal configured to receive the first refresh threshold iTH1, and an output terminal. The comparator 52 may be configured to compare the second feedback signal iBST2_F with the first refresh threshold ITH1 to generate a comparing signal CA22. In an embodiment, when the second feedback signal iBST2_F is smaller than the first refresh threshold iTH1, the comparing signal CA22 is in the active state (e.g., the logic high state).

The "OR" logic gate 55 may comprise a first input terminal configured to receive the comparing signal CA21, a second input terminal configured to receive the comparing signal CA22, and an output terminal. The "OR" logic gate 55 may be configured to conduct "OR" logic operation to the comparing signal CA21 and the second comparing signal CA22 to provide a logic signal CP21 at the output terminal. Either the comparing signal CA21 or the comparing signal CA22 is in the active state, the logic signal CP21 is activated to control the switch 571 on.

The comparator 53 may comprise a first input terminal configured to receive the feedback signal iBST1_F, a second input terminal configured to receive a second refresh threshold iTH2, and an output terminal, wherein the second refresh threshold iTH2 is smaller than the first refresh threshold iTH1. The comparator 53 may be configured to compare the first feedback signal iBST1_F with the second refresh threshold iTH2 to generate a comparing signal CA23. In an embodiment, when the first feedback signal iBST1_F is smaller than the second refresh threshold iTH2, the comparing signal CA23 is in the active state (e.g., logic high state).

The comparator 54 may comprise a first input terminal configured to receive the second feedback signal iBST2_F, a second input terminal configured to receive the second refresh threshold iTH2 and an output terminal. The comparator 54 may be configured to compare the second feedback signal iBST2_F with the second refresh threshold iTH2 to generate a comparing signal CA24. In an embodiment, when the second feedback signal iBST2_F is smaller than the second refresh threshold iTH2, the comparing signal CA24 is in the active state (e.g., logic high state).

The "OR" logic gate 46 may comprise a first input terminal configured to receive the comparing signal CA23, a second input terminal configured to receive the comparing signal CA24, and an output terminal. The "OR" logic gate 56 may be configured to conduct "OR" logic operation to the comparing signal CA23 and the comparing signal CA24 to provide a logic signal CP22 at the output terminal. Either comparing signal CA23 or the comparing signal CA24 is in the active state, the logic signal CP22 is activated to control the switch 572 on.

The switch 571 may have a first terminal configured to receive the output voltage signal VOUT, a second terminal coupled to the second current regulating circuit 59 via the diode 581, and a control terminal configured to receive the logic signal CP21. The switch 572 may have a first terminal configured to receive the second pump voltage signal VPUMP2, a second terminal coupled to the second current regulating circuit 59 via the diode 582, and a control terminal configured to receive the logic signal CP22.

When the first feedback signal iBST1_F or the second feedback signal iBST2_F is smaller than the first refresh threshold iTH1 and larger than the second refresh threshold iTH2 (i.e., the first logic signal CP21 is active, and the second logic signal CP22 is inactive), the output voltage signal VOUT is provided to the second current regulating circuit 59 through the switch 571 and the diode 581. The second current regulating circuit 59 may be configured to receive the output voltage signal VOUT, the first feedback signal iBST1_F and the second feedback signal iBST2_F, and further configured to generate the third charging current signal i21 based on the output voltage signal VOUT and the first feedback signal iBST1_F, and to generate the fourth charging current signal i22 based on the output voltage signal VOUT and the second feedback signal iBST2_F. In an embodiment, the larger the first feedback signal iBST1_F is, the smaller the third charging current signal i21 is; and the larger the second feedback signal iBST2_F is, the smaller the fourth charging current signal i22 is.

When the first feedback signal iBST1_F or the second feedback signal iBST2_F is smaller than the second refresh threshold iTH2 (i.e., both the logic signal CP21 and the logic signal CP22 are active), both the output voltage signal VOUT and the second pump voltage signal VPUMP2 are provided to the second current regulating circuit 59. The second current regulating circuit 59 may be configured to receive the output voltage signal VOUT, the second pump voltage signal VPUMP2, the first feedback signal iBST1_F and the second feedback signal iBST2_F, and further configured generate the third charging current signal i21 based on the output voltage signal VOUT, the second pump voltage signal VPUMP2 and the first feedback signal iBST1_F, and to generate the fourth charging current signal i22 based on output voltage signal VOUT, the second pump voltage signal VPUMP2 and the second feedback signal iBST2_F. In an embodiment, the larger the first feedback signal iBST1_F is, the smaller the third charging current signal i21 is; and the larger the second feedback signal iBST2_F is, the smaller the fourth charging current signal i22 is.

When the first feedback signal iBST1_F or the second feedback signal iBST2_F is larger than the first refresh threshold iTH1, both the switch 571 and the switch 572 are turned off. The second current regulating circuit 59 is unable to generate the third charging current signal i21 and the fourth charging current signal i22.

Figure 7:
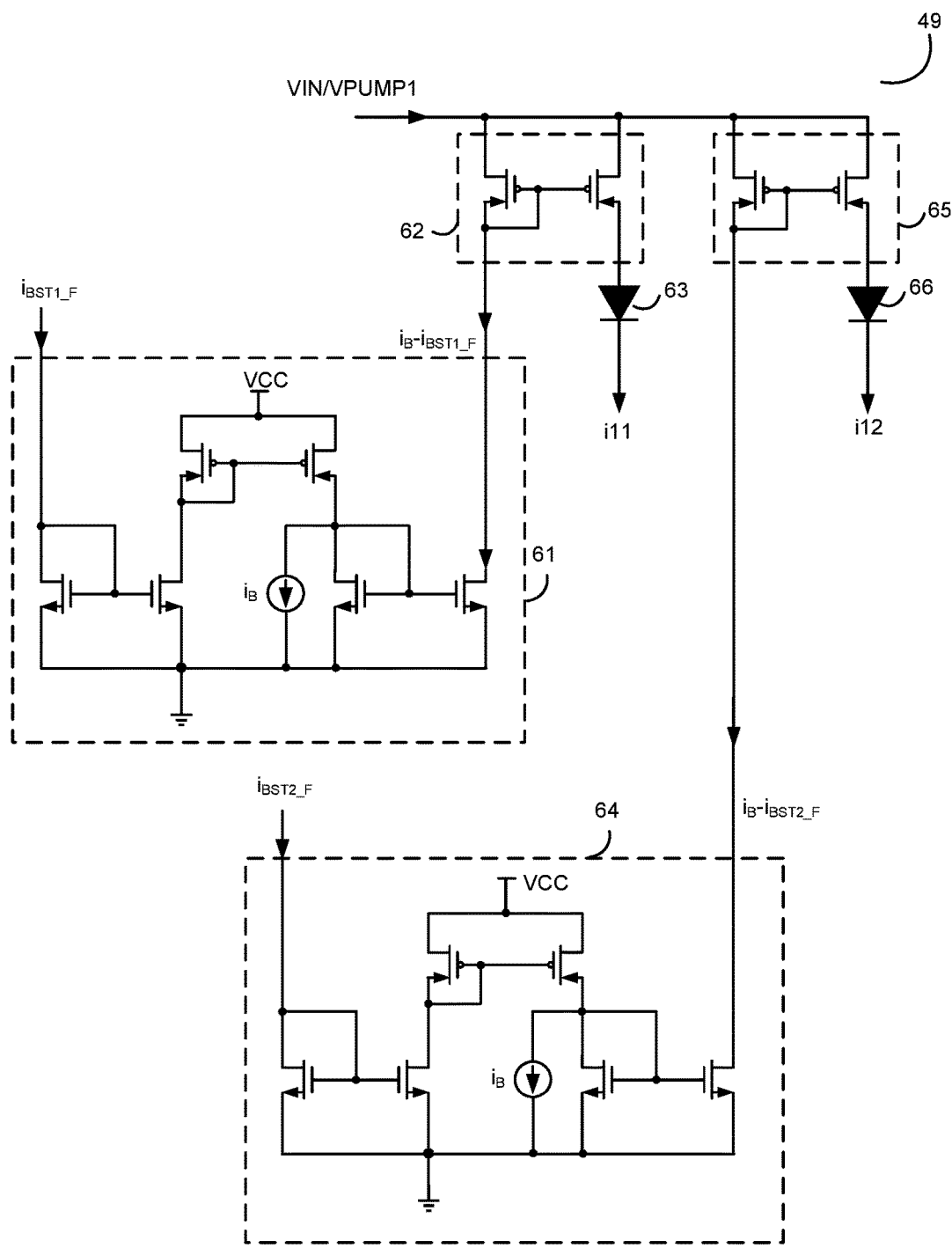
FIG. 7 illustrates a schematic diagram of the first current regulator 49 of FIG. 5 in accordance with an exemplary embodiment of the present invention.

FIG. 7 illustrates a schematic diagram of the first current regulator 49 of FIG. 5 in accordance with an exemplary embodiment of the present invention. As shown in FIG. 7, the first current regulator 49 may comprise a first subtracting circuit 61, a current mirror circuit 62, a diode 63, a second subtracting circuit 64, a current mirror circuit 65 and a diode 66.

The first subtracting circuit 61 may be configured to receive the first feedback signal iBST1_F, and conduct a subtraction operation to the first feedback signal iBST1_F and a bias current signal IB to generate a first difference signal IB-iBST1_F. The current mirror circuit 62 may comprise a supply terminal configured to receive the input voltage signal VIN or the sum of the first pump voltage signal VPUMP1 and the input voltage signal VIN depending the value of the first feedback signal iBST1_F and the second feedback signal iBST2_F, a first current terminal configured to receive the first difference signal IB-iBST1_F, and a second current terminal coupled to the first bootstrap node BST1 through the diode 63. The current mirror circuit 62 may be configured to mirror the first difference signal IB-iBST1_F to provide the first charging current signal i11 at its second current terminal.

The second subtracting circuit 64 may be configured to receive the second feedback signal iBST2_F, and conduct a subtraction operation to the second feedback signal iBST2_F and a bias current signal IB to generate a second difference signal IB-iBST2_F. The current mirror circuit 65 may comprise a supply terminal configured to receive the input voltage signal VIN or the sum of the first pump voltage signal VPUMP1 and the input voltage signal VIN depending the value of the first feedback signal iBST1_F and the second feedback signal iBST2_F, a first current terminal configured to receive the second difference signal IB-iBST2_F, and a second current terminal coupled to the second bootstrap node BST2 through the diode 65. The current mirror circuit 64 may be configured to mirror the second difference signal IB-iBST2_F to provide the second charging current signal i12 at its second current terminal.

Figure 8:
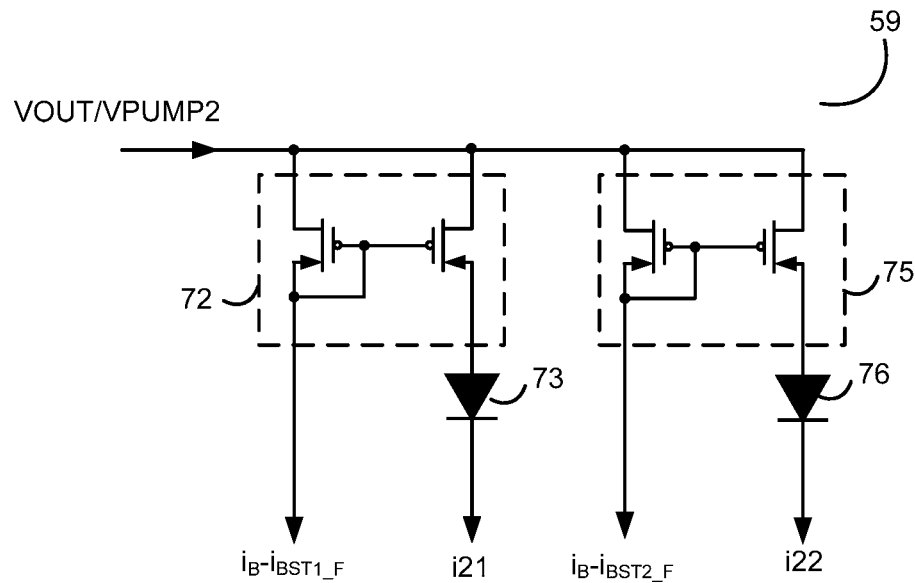
FIG. 8 illustrates a schematic diagram of the second current regulator 59 of FIG. 6 in accordance with an exemplary embodiment of the present invention.

FIG. 8 illustrates a schematic diagram of the second current regulator 59 of FIG. 6 in accordance with an exemplary embodiment of the present invention. As shown in FIG. 8, the second current regulator 59 may comprise a current mirror circuit 72, a diode 73, a current mirror circuit 75 and a diode 76.

The current mirror circuit 72 may comprise a supply terminal configured to receive the output voltage signal VOUT or the sum of the second pump voltage signal VPUMP2 and the output voltage signal VOUT depending the value of the first feedback signal iBST1_F and the second feedback signal iBST2_F, a first current terminal configured to receive the first difference signal IB-iBST1_F, and a second current terminal coupled to the first bootstrap node BST1 through the diode 73. The current mirror circuit 72 may be configured to mirror the first difference signal IB-iBST1_F to provide the third charging current signal i21 at its second current terminal.

The current mirror circuit 75 may comprise a supply terminal configured to receive the output voltage signal VOUT or the sum of the second pump voltage signal VPUMP2 and the output voltage signal VOUT depending the value of the first feedback signal iBST1_F and the second feedback signal iBST2_F, a first current terminal configured to receive the second difference signal IB-iBST2_F, and a second current terminal coupled to the second bootstrap node BST2 through the diode 75. The current mirror circuit 74 may be configured to mirror the second difference signal IB-iBST2_F to provide the fourth charging current signal i22 at its second current terminal.

In the exemplary embodiment of the present application, the first difference signal IB-iBST1_F and the second difference signal IB-iBST2_F are illustrated to be generated in the first current regulator 49. Those having ordinary skill in the art should understand that this is only used to provide an example and not intended to be limiting, the first difference signal IB-iBST1_F and the second difference signal IB-iBST2_F can also be generated in the second current regulator 59, and be directly adopted by the first current regulator 49.

Figure 9:
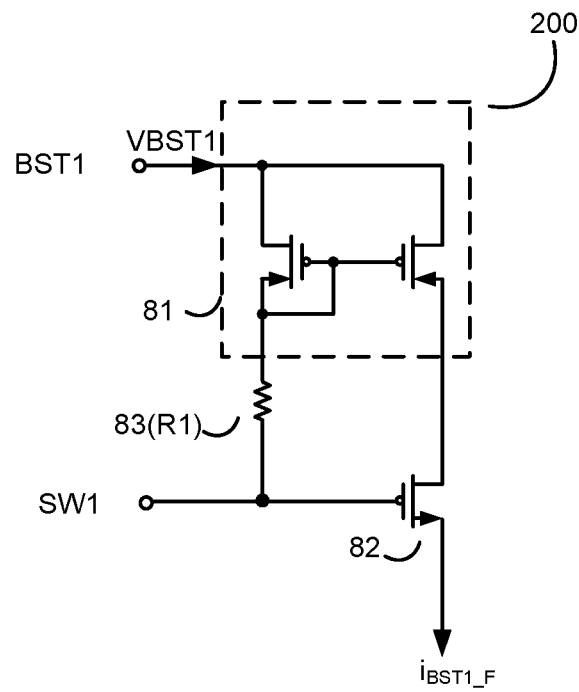
FIG. 9 illustrates a schematic diagram of a first feedback circuit 200 used for generating the first feedback signal in accordance with an exemplary embodiment of the present invention.

FIG. 9 illustrates a schematic diagram of a first feedback circuit 200 used for generating the first feedback signal iBST1_F in accordance with an exemplary embodiment of the present invention. As shown in FIG. 9, the first feedback circuit 200 may be coupled between the first bootstrap node BST1 and the first switching node SW1, and further configured to generate the first feedback signal iBST1_F based on the first bootstrap voltage VBST1. In an embodiment, the first feedback circuit 200 may comprise a current mirror circuit 81, a resistor 83 with a resistance R1 and a transistor 82. The current mirror circuit 82 may comprise a supply terminal coupled to the first bootstrap node BST1 to receive the first bootstrap voltage VBST1, a first current terminal coupled to the first switching node SW1 via the resistor 83, and a second current terminal. The transistor 82 may comprise a first terminal coupled to the second current terminal of the current mirror circuit 81, a control terminal coupled to the first switching node SW1, and a second terminal configured to provide the first feedback signal iBST1_F. In the exemplary embodiment of FIG. 9, the first feedback signal iBST1_F is equal to VBST1/R1.

Figure 10:
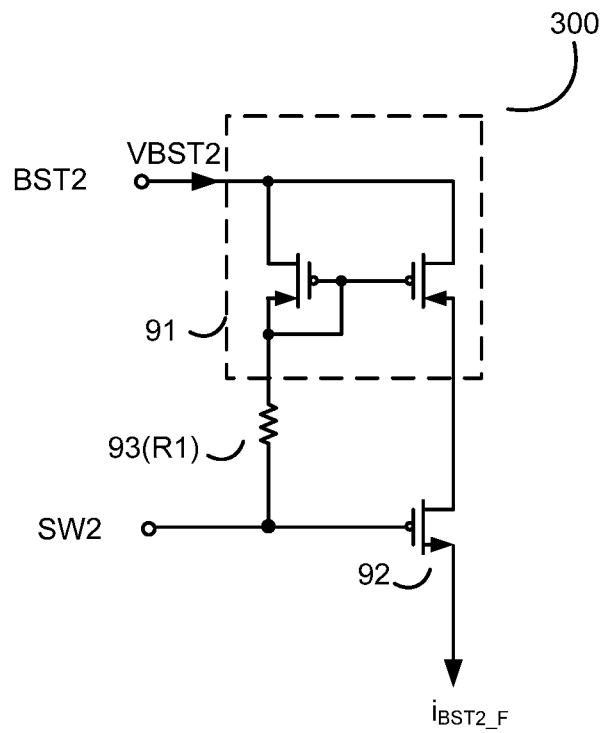
FIG. 10 illustrates a schematic diagram of a second feedback circuit 300 used for generating the second feedback signal in accordance with an exemplary embodiment of the present invention.

FIG. 10 illustrates a schematic diagram of a second feedback circuit 300 used for generating the second feedback signal iBST2_F in accordance with an exemplary embodiment of the present invention. As shown in FIG. 10, the second feedback circuit 300 may be coupled between the second bootstrap node BST2 and the second switching node SW2, and further configured to generate the second feedback signal iBST2_F based on the second bootstrap voltage VBST2. In an embodiment, the second feedback circuit 300 may comprise a current mirror circuit 91, a resistor 93 with a resistance R1 and a transistor 92. The current mirror circuit 92 may comprise a supply terminal coupled to the second bootstrap node BST2 to receive the second bootstrap voltage VBST2, a first current terminal coupled to the second switching node SW2 via the resistor 93, and a second current terminal. The transistor 92 may comprise a first terminal coupled to the second current terminal of the current mirror circuit 91, a control terminal coupled to the second switching node SW2, and a second terminal configured to provide the second feedback signal iBST2_F. In the exemplary embodiment of FIG. 10, the second feedback signal iBST2_F is equal to VBST2/R1.

Figure 11:
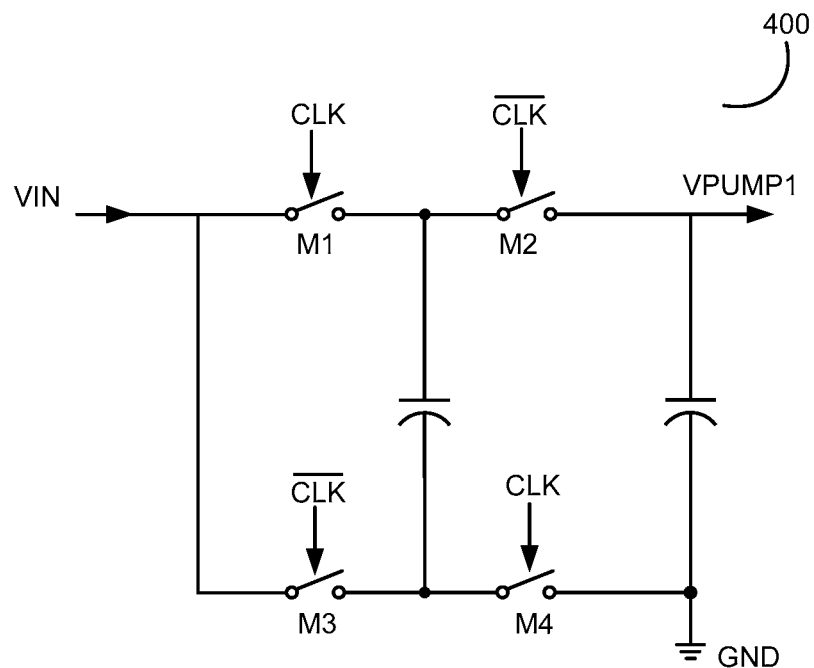
FIG. 11 illustrates a schematic diagram of a first charge pump 400 in accordance with an exemplary embodiment of the present invention.
Figure 12:
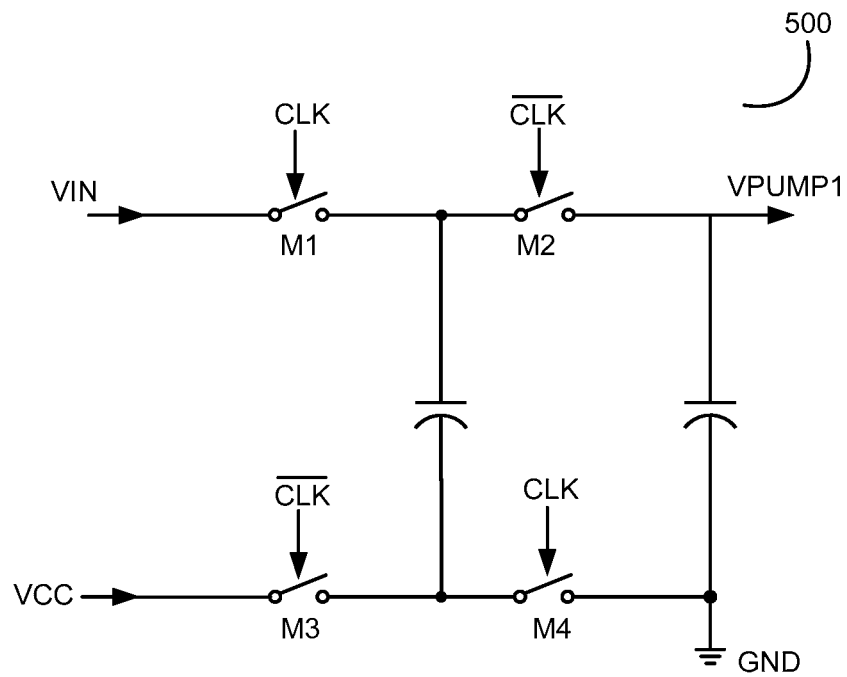
FIG. 12 illustrates a schematic diagram of a first charge pump 500 in accordance with an exemplary embodiment of the present invention.

FIG. 11 illustrates a schematic diagram of a first charge pump 400 in accordance with an exemplary embodiment of the present invention. As shown in FIG. 11, the first charge pump 400 may be illustrated to have a topology of a voltage double circuit comprising power switches M1-M4. Two complementary signals CLK and $\overline{CLK}$ are respectively configured to control power switches M1, M4 and power switches M2, M3. The first charge pump 400 may be configured to receive the input voltage signal VIN, and further configured to convent the input voltage signal VIN to the first bootstrap voltage VBST1 which equals twice of the input voltage signal VIN in value. Those having ordinary skill in the art should understand that the first charge pump 400 is only used to provide an example and not intended to be limiting, any other charge pump topology may also be adopted. For example, FIG. 12 illustrates a schematic diagram of a first charge pump 500 in accordance with an exemplary embodiment of the present invention. In the exemplary embodiment of FIG. 12, the charge pump 500 may be configured to generate the first bootstrap voltage VBST1 based on the input voltage signal VIN and the power supply VCC, wherein the first bootstrap voltage VBST1 is equal to the sum of the input voltage signal VIN and the power supply VCC. For the sake of simplicity, it will not be described in detail.

It should also be understood for those having ordinary skill in the art, the second charge pump 33 of FIG. 5 can also adopt the topologies as illustrated in FIGS. 11-12 through replacing the input voltage signal VIN with the output voltage signal VOUT.

Figure 13:
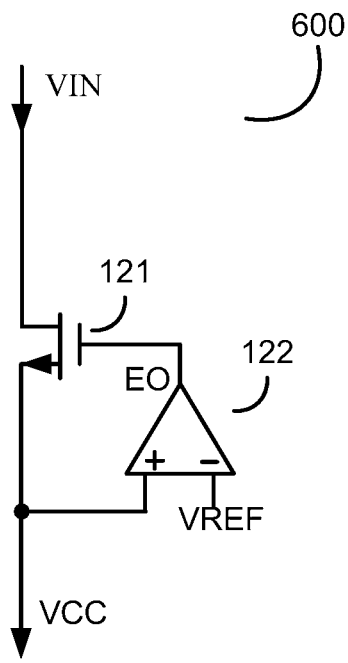
FIG. 13 illustrates a schematic diagram of a power supply generator 600 used to generate the power supply in accordance with an exemplary embodiment of the present invention.

FIG. 13 illustrates a schematic diagram of a power supply generator 600 used to generate the power supply VCC in accordance with an exemplary embodiment of the present invention. In the exemplary embodiment of FIG. 13, the power supply generator 600 is illustrated as a low dropout linear regulator (LDO) comprising a transistor 121 and an error amplifier 122. The transistor 121 may have a first terminal configured to receive the input voltage signal VIN, a second terminal configured to provide the power supply VCC, and a control terminal. The error amplifier 122 may have a first input terminal configured to receive a reference voltage signal VREF, a second input terminal coupled to the second terminal of the transistor 121 to receive the power supply VCC, and an output terminal coupled to the control terminal of the transistor 121, wherein the error amplifier 122 is configured to amplify the difference of the reference voltage signal VREF and the power supply VCC to provide an error signal EO at the output terminal for controlling the transistor 121.

Figure 14:
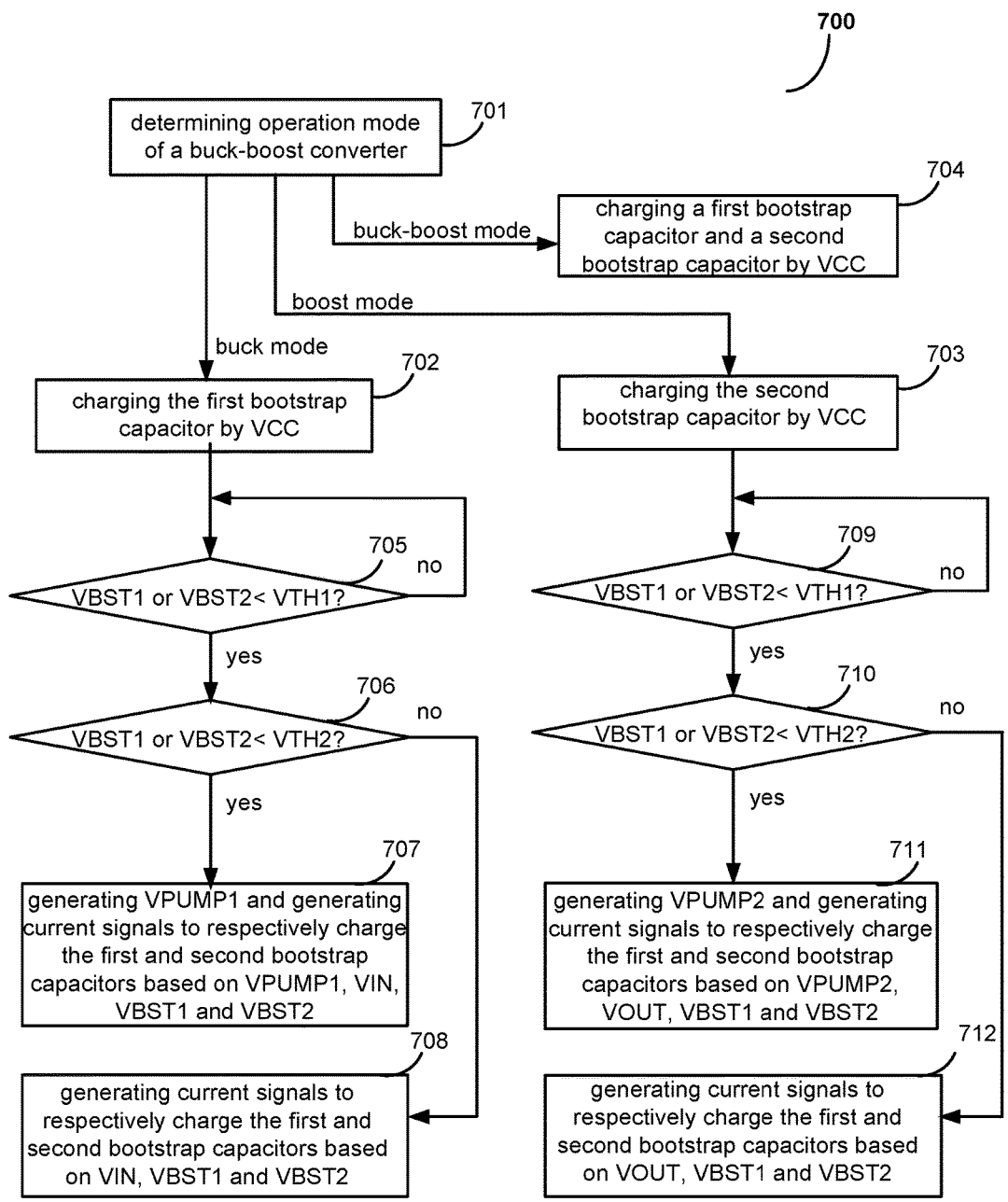
FIG. 14 illustrates a driving method 700 for controlling a buck-boost power converter.

FIG. 14 illustrates a driving method 700 for controlling a buck-boost power converter (e.g., the buck-boost power converter 200 as shown in FIG. 2). The buck-boost power converter may comprise a first power switch (e.g., the first power switch 11 as shown in FIG. 2) and a third power switch (e.g., the third power switch 13 as shown in FIG. 2) coupled in series between an input port and a reference ground, a second power switch (e.g., the second power switch 12 as shown in FIG. 2) and a fourth power switch (e.g., the fourth power switch 14 as shown in FIG. 2) coupled in series between an output port and the reference ground, a first bootstrap capacitor (e.g., the first bootstrap capacitor 23 as shown in FIG. 3) configured to provide a first bootstrap voltage signal (e.g., the first bootstrap voltage signal VBST1 as shown in FIG. 3) used for driving of the first power switch, and a second bootstrap capacitor (e.g., the second bootstrap capacitor 24 as shown in FIG. 3) configured to provide a second bootstrap voltage signal (e.g., the second bootstrap voltage signal VBST2 as shown in FIG. 3) used for driving of the second power switch, wherein the first power switch and the third power switch have a common connection referred to as a first switching node (e.g., the first switching node SW1 as shown in FIG. 2), and the second power switch and the fourth power switch have a common connection referred to as a second switching node (e.g., the second switching node SW2 as shown in FIG. 2), and wherein an inductor (e.g., the inductor 105 as shown in FIG. 2) is coupled between the first switching node and the second switching node. The method 700 may comprise steps 701-712.

In step 701, determining operating mode of the buck-boost power converter.

When the buck-boost power converter operates in the buck mode, the driving method 700 may go through step 702 and steps 705-708.

In step 702, charging the first bootstrap capacitor by a power supply (e.g., the power supply VC as shown in FIG. 3) when the third power switch is turned on.

Then, determining whether the first bootstrap voltage signal or the second bootstrap voltage signal is smaller than a bootstrap refresh threshold. If the first bootstrap voltage signal or the second bootstrap voltage signal is smaller than the bootstrap refresh threshold, generating a first charging current signal (e.g., the first charging current signal i11 as shown in FIG. 3) and a second charging current signal (e.g., the second charging current signal i12 as shown in FIG. 3) to respectively charge the first bootstrap capacitor and the second bootstrap capacitor based on an input voltage signal, the first bootstrap voltage signal and the second bootstrap voltage signal. In an embodiment, this step may comprise steps 705-708, and the bootstrap refresh threshold may comprise a first refresh threshold VTH1 and a second refresh threshold VTH2, wherein the second refresh threshold VTH2 is smaller than the first refresh threshold VTH1.

In step 705, determining whether the first bootstrap voltage signal or the second bootstrap voltage signal is smaller than the first refresh threshold VTH1. If the first bootstrap voltage signal or the second bootstrap voltage signal is smaller than the first refresh threshold VTH1, turns to step 706, otherwise, continues to step 705.

In step 706, determining whether the first bootstrap voltage signal or the second bootstrap voltage signal is smaller than the second refresh threshold VTH2. If the first bootstrap voltage signal or the second bootstrap voltage signal is smaller than the second refresh threshold VTH2, turns to step 707, otherwise, turns to step 708.

In step 707, pumping the input voltage signal to generate a first pump voltage signal, and generating the first charging current signal, and the second charging current signal based on the input voltage signal, the first pump voltage signal, the first bootstrap voltage signal and the second bootstrap voltage signal.

In step 708, generating the first charging current signal and the second charging current signal based on the input voltage signal, the first bootstrap voltage signal and the second bootstrap voltage signal.

When the buck-boost power converter operates in the boost mode, the driving method 700 may go through step 703 and steps 709-712.

In step 703, charging the second bootstrap capacitor by the power supply when the fourth power switch is turned on.

Then, determining whether the first bootstrap voltage signal or the second bootstrap voltage signal is smaller than the bootstrap refresh threshold. When the first bootstrap voltage signal or the second bootstrap voltage signal is smaller than the bootstrap refresh threshold, generating a third charging current signal (e.g., the third charging current signal i21 as shown in FIG. 3) and a fourth charging current signal (e.g., the fourth charging current signal i22 as shown in FIG. 3) to respectively charge the first bootstrap capacitor and the second bootstrap capacitor based on an output voltage signal, the first bootstrap voltage signal and the second bootstrap voltage signal. In an embodiment, this step may comprise steps 709-712, and the bootstrap refresh threshold may comprise the first refresh threshold VTH1 and the second refresh threshold VTH2, wherein the second refresh threshold VTH2 is smaller than the first refresh threshold VTH1

In step 709, determining whether the first bootstrap voltage signal or the second bootstrap voltage signal is smaller than the first refresh threshold VTH1. If the first bootstrap voltage signal or the second bootstrap voltage signal is smaller than the first refresh threshold VTH1, turns to step 710, otherwise, continues to step 709.

In step 710, determining whether the first bootstrap voltage signal or the second bootstrap voltage signal is smaller than the second refresh threshold VTH2. If the first bootstrap voltage signal or the second bootstrap voltage signal is smaller than the second refresh threshold VTH2, turns to step 711, otherwise, turns to step 712.

In step 711, pumping the output voltage signal to generate a second pump voltage signal, and generating the third charging current signal, and the fourth charging current signal based on the output voltage signal, the second pump voltage signal, the first bootstrap voltage signal and the second bootstrap voltage signal.

In step 712, generating the third charging current signal, and the fourth charging current signal based on the output voltage signal, the first bootstrap voltage signal and the second bootstrap voltage signal.

When the buck-boost power converter operates in the buck-boost mode, the driving method 700 may go through step 704.

In step 704, charging the first bootstrap capacitor by the power supply when the third power switch is turned on, and charging the second bootstrap capacitor by the power supply when the fourth power switch is turned on.

It should be understood, in the exemplary embodiment of FIG. 14, step 706 is illustrated behind of step 705, and step 710 is illustrated behind of step 709. But in the other embodiment, step 705 and step 706 can be happened simultaneously, and step 709 and step 710 can be happened simultaneously.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A driving circuit for a buck-boost power converter having a first power switch and a third power switch coupled in series between an input port and a reference ground, and a second power switch and a fourth power switch coupled in series between an output port and the reference ground, comprising:
   a first bootstrap capacitor, configured to provide a first bootstrap voltage signal to drive the first power switch;
   a second bootstrap capacitor, configured to provide a second bootstrap voltage signal to drive the second power switch;
   a first current control circuit;
   a second current control circuit; and
   a power supply, configured to charge the first bootstrap capacitor when the third power switch is turned on, and the second bootstrap capacitor when the fourth power switch is turned on; wherein
   when the buck-boost power converter operates in a buck mode, the second current control circuit is disabled, and the first current control circuit is enabled to receive an input voltage signal, the first bootstrap voltage signal and the second bootstrap voltage signal, and wherein when the first bootstrap voltage signal or the second bootstrap voltage signal is smaller than a bootstrap refresh threshold, the first current control circuit is configured to generate a first charging current signal and a second charging current signal to respectively charge the first bootstrap capacitor and the second bootstrap capacitor; and wherein
   when the buck-boost power converter operates in a boost mode, the first current control circuit is disabled, and the second current control circuit is enabled to receive an output voltage signal, the first bootstrap voltage signal and the second bootstrap voltage signal, and wherein when the second bootstrap voltage signal or the second bootstrap voltage signal is smaller than a bootstrap refresh threshold, the first current control circuit is configured to generate a third charging current signal and a fourth charging current signal to respectively charge the first bootstrap capacitor and the second bootstrap capacitor; and wherein
   when the buck-boost power converter operates in a buck-boost mode, both the first current control circuit and the second current control circuit are disabled.

2. The driving circuit of claim 1, wherein the larger the first bootstrap voltage signal is, the smaller the first charging current signal and the third charging current signal are; and wherein the larger the second bootstrap voltage signal is, the smaller the second charging current signal and the fourth charging current signal are.

3. The driving circuit of claim 1, wherein when the buck-boost power converter operates in the buck mode, the bootstrap refresh threshold comprises a first refresh threshold and a second refresh threshold, and wherein the second refresh threshold is smaller than the first refresh threshold, and wherein
   when the first bootstrap voltage signal or the second bootstrap voltage signal is smaller than the first refresh threshold and larger than the second refresh threshold, the first current control circuit is configured to generate the first charging current signal and the second charging current signal based on the input voltage signal, a first feedback signal indicative of the first bootstrap voltage signal and a second feedback signal indicative of the second bootstrap voltage signal; and wherein
   when the first bootstrap voltage signal or the second bootstrap voltage signal is smaller than the second refresh threshold, the first current control circuit is configured to pump the input voltage signal to generate a first pump voltage signal, and further configured to generate the first charging current signal and the second charging current signal based on the input voltage signal, the first pump voltage signal, the first feedback signal and the second feedback signal.

4. The driving circuit of claim 1, wherein when the buck-boost power converter operates in the boost mode, the bootstrap refresh threshold comprises a first refresh threshold and a second refresh threshold, and wherein the second refresh threshold is smaller than the first refresh threshold, and wherein
   when the first bootstrap voltage signal or the second bootstrap voltage signal is smaller than the first refresh threshold and larger than the second refresh threshold, the second current control circuit is configured to generate the third charging current signal and the fourth charging current signal based on the output voltage signal, a first feedback signal indicative of the first bootstrap voltage signal and a second feedback signal indicative of the second bootstrap voltage signal; and wherein
   when the first bootstrap voltage signal or the second bootstrap voltage signal is smaller than the second refresh threshold, the second current control circuit is configured to pump the output voltage signal to generate a second pump voltage signal, and further configured to generate the third charging current signal and the fourth charging current signal based on the output voltage signal, the second pump voltage signal, the first feedback signal and the second feedback signal.

5. The driving circuit of claim 1, further comprising:
   a first charging switch, coupled between the first bootstrap capacitor and the power supply, wherein on and off switching of the first charging switch is simultaneous with on and off switching of the third power switch; and
   a second charging switch, coupled between the second bootstrap capacitor and the power supply, wherein on and off switching of the second charging switch is simultaneous with on and off switching of the fourth power switch.

6. The driving circuit of claim 1, further comprising:
an inductor, coupled between a common connection of the first power switch and the third power switch and a common connection of the second power switch and the fourth power switch;
a first driver, having an input terminal configured to receive a first control signal, a first supply terminal configured to receive the first bootstrap voltage signal, a second supply terminal coupled to the common connection of the first power switch and the third power switch, and an output terminal configured to provide a first driving signal to drive the first power switch on and off;
a second driver, comprising an input terminal configured to receive a second control signal, a first supply terminal configured to receive the second bootstrap voltage signal, a second supply terminal coupled to the common connection of the second power switch and the fourth power switch, and an output terminal configured to provide a second driving signal to drive the second power switch on and off;
a third driver, configured to receive a third control signal to generate a third driving signal to drive the third power switch on and off; and
a fourth driver, configured to receive a fourth control signal to generate a fourth driving signal to drive the fourth power switch on and off.

7. The driving circuit of claim 1, further comprising:
a mode determining circuit, configured to generate a first enable signal to enable and disable the first current control circuit, and a second enable signal to enable and disable the second current control circuit.

8. The driving circuit of claim 1, wherein the first current control circuit comprises:
a first charge pump, configured to receive the input voltage signal, and further configured to generate a first pump voltage signal based on the input voltage signal, wherein the first pump voltage signal is larger than the input voltage signal; and
a first charging circuit, configured to receive the first pump voltage signal, the input voltage signal, a first feedback signal indicative of the first bootstrap voltage signal and a second feedback signal indicative of the second bootstrap voltage signal to generate the first charging current signal and the second charging current signal.

9. The driving circuit of claim 1, wherein the second current control circuit comprises:
a second charge pump, configured to receive the output voltage signal, and further configured to generate a second pump voltage signal based on the output voltage signal, wherein the second pump voltage signal is larger than the output voltage signal; and
a second charging circuit, configured to receive the second pump voltage signal, the output voltage signal, a first feedback signal indicative of the first bootstrap voltage signal and a second feedback signal indicative of the second feedback signal, and further configured to generate the third charging current signal and the fourth charging current signal.

10. The driving circuit of claim 8, wherein the bootstrap refresh threshold comprises a first refresh threshold and a second refresh threshold, and wherein the second refresh threshold is smaller than the first refresh threshold, and wherein the first charging circuit comprises:

a first comparator, configured to receive and compare the first feedback signal with the first refresh threshold to generate a first comparing signal;
a second comparator, configured to receive and compare the second feedback signal with the first refresh threshold to generate a second comparing signal;
a first logic gate, configured to receive and conduct a logic operation to the first comparing signal and the second comparing signal to provide a first logic signal;
a third comparator, configured to receive and compare the first feedback signal with the second refresh threshold to generate a third comparing signal;
a fourth comparator, configured to receive and compare the second feedback signal with the second refresh threshold to generate a fourth comparing signal;
a second logic gate, configured to receive and conduct a logic operation to the third comparing signal and the fourth comparing signal to provide a second logic signal;
a first current regulating circuit;
a first switch, having a first terminal configured to receive the input voltage signal, a second terminal coupled to the first current regulating circuit via a first diode, and a control terminal configured to receive the first logic signal; and
a second switch, having a first terminal configured to receive the first pump voltage signal, a second terminal coupled to the first current regulating circuit via a second diode, and a control terminal configured to receive the second logic signal; wherein
when the first feedback signal or the second feedback signal is smaller than the first refresh threshold and larger than the second refresh threshold, the first current regulating circuit is configured to receive the input voltage signal, the first feedback signal and the second feedback signal to generate the first charging current signal based on the input voltage signal and the first feedback signal, and to generate the second charging current signal based on the input voltage signal and the second feedback signal; and wherein
when the first feedback signal or the second feedback signal is smaller than the second refresh threshold, the first current regulating circuit is configured to receive the input voltage signal, the first pump voltage signal, the first feedback signal and the second feedback signal to generate the first charging current signal based on the input voltage signal, the first pump voltage signal and the first feedback signal, and to generate the second charging current signal based on the input voltage signal, the first pump voltage signal and the second feedback signal.

11. The driving circuit of claim 9, wherein the bootstrap refresh threshold comprises a first refresh threshold and a second refresh threshold, and wherein the second refresh threshold is smaller than the first refresh threshold, and wherein the second charging circuit comprises:
a first comparator, configured to receive and compare the first feedback signal with the first refresh threshold to generate a first comparing signal;
a second comparator, configured to receive and compare the second feedback signal with the first refresh threshold to generate a second comparing signal;
a first logic gate, configured to receive and conduct a logic operation to the first comparing signal and the second comparing signal to provide a first logic signal;

a third comparator, configured to receive and compare the first feedback signal with the second refresh threshold to generate a third comparing signal;
a fourth comparator, configured to receive and compare the second feedback signal with the second refresh threshold to generate a fourth comparing signal;
a second logic gate, configured to receive and conduct a logic operation to the third comparing signal and the fourth comparing signal to provide a second logic signal;
a second current regulating circuit;
a first switch, having a first terminal configured to receive the output voltage signal, a second terminal coupled to the second current regulating circuit via a first diode, and a control terminal configured to receive the first logic signal; and
a second switch, having a first terminal configured to receive the second pump voltage signal, a second terminal coupled to the second current regulating circuit via a second diode, and a control terminal configured to receive the second logic signal; wherein
when the first feedback signal or the second feedback signal is smaller than the first refresh threshold and larger than the second refresh threshold, the second current regulating circuit is configured to receive the output voltage signal, the first feedback signal and the second feedback signal to generate the third charging current signal based on the output voltage signal and the first feedback signal, and to generate the fourth charging current signal based on the output voltage signal and the second feedback signal; and wherein
when the first feedback signal or the second feedback signal is smaller than the second refresh threshold, the second current regulating circuit is configured to receive the output voltage signal, the second pump voltage signal, the first feedback signal and the second feedback signal to generate the third charging current signal based on the output voltage signal, the second pump voltage signal and the first feedback signal, and to generate the fourth charging current signal based on the output voltage signal, the second pump voltage signal, and the second feedback signal.

12. The driving circuit of claim 10, wherein the first current regulating circuit comprises:
a first subtracting circuit, configured to receive and conduct a subtraction operation to the first feedback signal and a bias current signal to generate a first difference signal;
a first current mirror circuit, comprising a supply terminal configured to receive the input voltage signal or the sum of the first pump voltage signal and the input voltage signal, a first current terminal configured to receive the first difference signal, and a second current terminal to provide the first charging current signal;
a second subtracting circuit, configured to receive and conduct a subtraction operation to the second feedback signal and a bias current signal to generate a second difference signal; and
a second current mirror circuit, comprising a supply terminal configured to receive the input voltage signal or the sum of the first pump voltage signal and the input voltage signal, a first current terminal configured to receive the second difference signal, and a second current terminal to provide the second charging current signal.

13. The driving circuit of claim 11, wherein second current regulating circuit comprises:

a first subtracting circuit, configured to receive and conduct a subtraction operation to the first feedback signal and a bias current signal to generate a first difference signal;
a third current mirror circuit, comprising a supply terminal configured to receive the output voltage signal or the sum of the second pump voltage signal and the output voltage signal, a first current terminal configured to receive the first difference signal, and a second current terminal configured to provide the third charging current signal;
a second subtracting circuit, configured to receive and conduct a subtraction operation to the second feedback signal and a bias current signal to generate a second difference signal; and
a fourth current mirror circuit, comprising a supply terminal configured to receive the output voltage signal or the sum of the second pump voltage signal and the output voltage signal, a first current terminal configured to receive the second difference signal, and a second current terminal configured to provide the fourth charging current signal.

14. A driving method for a buck-boost power converter having a first power switch and a third power switch coupled in series between an input port and a reference ground, a second power switch and a fourth power switch coupled in series between an output port and the reference ground, a first bootstrap capacitor configured to provide a first bootstrap voltage signal to drive the first power switch, and a second bootstrap capacitor configured to provide a second bootstrap voltage signal to drive the second power switch, wherein a common connection of the first power switch and the second power switch is connected to common connection of the third power switch and the fourth power switch through an inductor, and the driving method comprising:
determining an operating mode of the buck-boost power converter;
when the operating mode is a buck mode:
charging the first bootstrap capacitor by a power supply when the third power switch is turned on;
determining whether the first bootstrap voltage signal or the second bootstrap voltage signal is smaller than a bootstrap refresh threshold;
if the first bootstrap voltage signal or the second bootstrap voltage signal is smaller than the bootstrap refresh threshold, generating a first charging current signal and a second charging current signal to respectively charge the first bootstrap capacitor and the second bootstrap capacitor based on an input voltage signal, the first bootstrap voltage signal and the second bootstrap voltage signal; and
when the operating mode is a boost mode:
charging the second bootstrap capacitor by the power supply when the fourth power switch is turned on;
determining whether the first bootstrap voltage signal or the second bootstrap voltage signal is smaller than the bootstrap refresh threshold;
if the first bootstrap voltage signal or the second bootstrap voltage signal is smaller than the bootstrap refresh threshold, generating a third charging current signal and a fourth charging current signal to respectively charge the first bootstrap capacitor and the second bootstrap capacitor based on an output voltage signal, the first bootstrap voltage signal and the second bootstrap voltage signal; and
when the operating mode is a buck-boost mode, charging the first bootstrap capacitor by the power supply once the third power switch is turned on, and charging the second bootstrap capacitor by the power supply once the fourth power switch is turned on.

15. The driving method of claim 14, wherein the bootstrap refresh threshold comprises a first refresh threshold and a second refresh threshold, and wherein the second refresh threshold is smaller than the first refresh threshold, and wherein when the buck-boost power converter operates in the buck mode, determining whether the first bootstrap voltage signal or the second bootstrap voltage signal is smaller than the bootstrap refresh threshold comprises:
- comparing the first bootstrap voltage signal and the second bootstrap voltage signal with the first refresh threshold; and
- comparing the first bootstrap voltage signal and the second bootstrap voltage signal with the second refresh threshold.

16. The driving method of claim 15, generating the first charging current signal and the second charging current signal based on the input voltage signal, the first bootstrap voltage signal and the second bootstrap voltage signal comprises:
- generating a first feedback signal indicative of the first bootstrap voltage signal;
- generating a second feedback signal indicative of the second bootstrap voltage signal;
- if the first bootstrap voltage signal or the second bootstrap voltage signal is smaller than the first refresh threshold and larger than the second refresh threshold, generating the first charging current signal and the second charging current signal based on the input voltage signal, the first feedback signal and the second feedback signal; and
- if the first bootstrap voltage signal or the second bootstrap voltage signal is smaller than the second refresh threshold, pumping the input voltage signal to generate a first pump voltage signal, and generating the first charging current signal and the second charging current signal based on the input voltage signal, the first pump voltage signal, the first feedback signal and the second feedback signal.

17. The driving method of claim 14, wherein the bootstrap refresh threshold comprises a first refresh threshold and a second refresh threshold, and wherein the second refresh threshold is smaller than the first refresh threshold, and wherein when the buck-boost power converter operates in the boost mode, determining whether the first bootstrap voltage signal or the second bootstrap voltage signal is smaller than the bootstrap refresh threshold comprises:
- comparing the first bootstrap voltage signal and the second bootstrap voltage signal with the first refresh threshold; and
- comparing the first bootstrap voltage signal and the second bootstrap voltage signal with the second refresh threshold.

18. The driving method of claim 17, generating the third charging current signal and the fourth charging current signal based on the output voltage signal, the first bootstrap voltage signal and the second bootstrap voltage signal comprises:
- generating a first feedback signal indicative of the first bootstrap voltage signal;
- generating a second feedback signal indicative of the second bootstrap voltage signal;
- if the first bootstrap voltage signal or the second bootstrap voltage signal is smaller than the first refresh threshold and larger than the second refresh threshold, generating the third charging current signal and the fourth charging current signal based on the output voltage signal, the first feedback signal and the second feedback signal; and
- if the first bootstrap voltage signal or the second bootstrap voltage signal is smaller than the second refresh threshold, pumping the input voltage signal to generate a second pump voltage signal, and generating the third charging current signal and the fourth charging current signal based on the output voltage signal, the second pump voltage signal, the first feedback signal and the second feedback signal.

19. The driving method of claim 14, wherein the larger the first bootstrap voltage signal is, the smaller the first charging current signal and the third charging current signal are; and wherein the larger the second bootstrap voltage signal is, the smaller the second charging current signal and the fourth charging current signal are.

* * * * *